United States Patent [19]

Lui et al.

[11] 4,077,028
[45] Feb. 28, 1978

[54] ERROR CHECKING AND CORRECTING DEVICE

[75] Inventors: Albert S. Lui; Majid Arbab, both of San Diego, Calif.

[73] Assignee: NCR Corporation, Dayton, Ohio

[21] Appl. No.: 695,494

[22] Filed: Jun. 14, 1976

[51] Int. Cl.$^2$ ............................................. G06F 11/12
[52] U.S. Cl. ........................................... 340/146.1 AL
[58] Field of Search ............................... 340/146.1 AL

[56] References Cited

U.S. PATENT DOCUMENTS

| 3,697,948 | 10/1972 | Bossen | 340/146.1 AL |
| 3,745,525 | 7/1973 | Hong et al. | 340/146.1 AL |
| 3,745,526 | 7/1973 | Hong et al. | 340/146.1 AL |

Primary Examiner—Charles E. Atkinson
Attorney, Agent, or Firm—J. T. Cavender; Edward Dugas

[57] ABSTRACT

An error checking and correcting device for providing group error detection in addition to single error correction and double error detection in a codeword transmitted through a modular communication channel is disclosed. The codeword comprises a plurality of data bits and a plurality of check bits. The modular communication channel comprises a plurality of modules in each of which a group (or cluster) of bits are transferred in parallel. In the preferred embodiment, the code word contains 40 bits with 32 data bits and 8 check bits, and the modular communication channel is a computer memory comprising 10 modules with 4 bits per module. At the transmitter, the check bit generator generates the check bits from the data bits in accordance with an H-matrix which is partitioned into h-submatrices corresponding to group boundaries of the memory. The construction of the h-submatrices is in accordance with rules necessary for group error detection in addition to single error correction and double error detection. The check bits are appended to the data bits to form a 40 bit code word which is transmitted through the modular memory. At the receiver, a syndrome bit generator generates 8 syndrome bits from the received code word in accordance with the H-matrix. The output of the syndrome bit generator is coupled to both the error detection circuit and the error location circuit. Should a group in the memory be faulty in the process of transmission resulting in a number of bits in the group being in error, logic means are provided in the error detection circuit to identify correctable good data from uncorrectable bad data. According to the syndrome pattern the error detection circuit permits the utilization of received data if no error is detected, or enables the error location circuit to provide single error correction if a single error is detected; or sets an error flag to prohibit the utilization of received data if a random double error is detected or a plurality of errors in the same group are detected.

10 Claims, 5 Drawing Figures

FIG. 2
FIG. 3
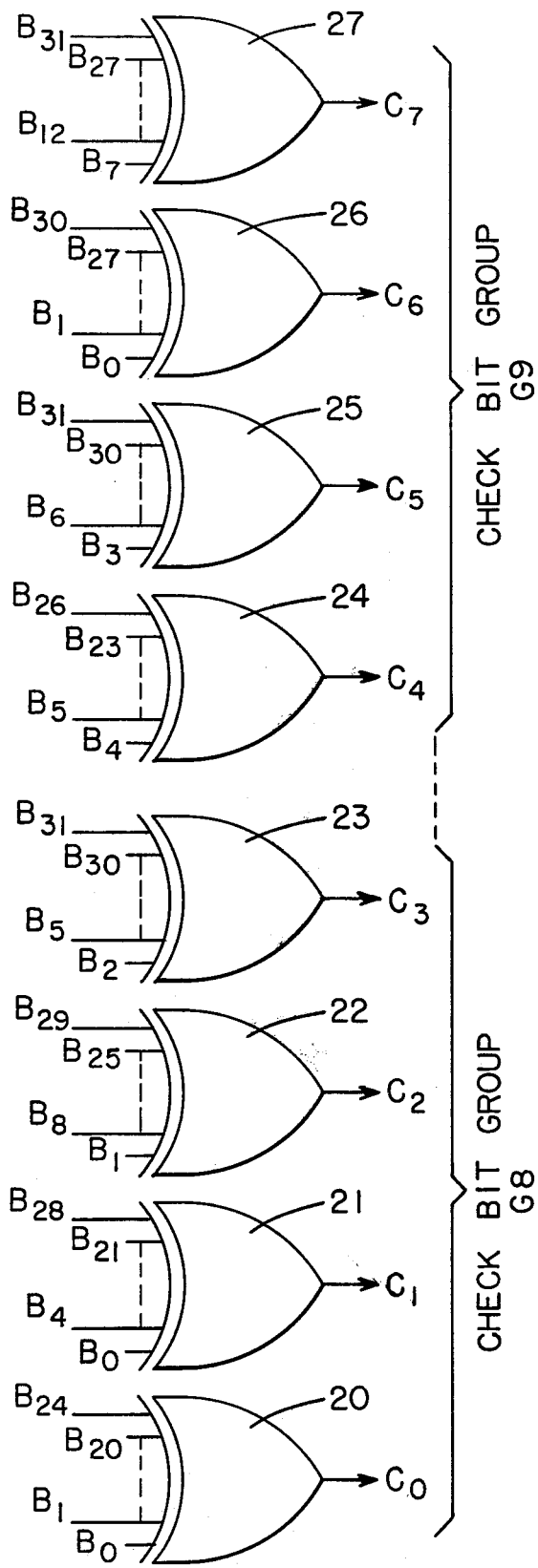
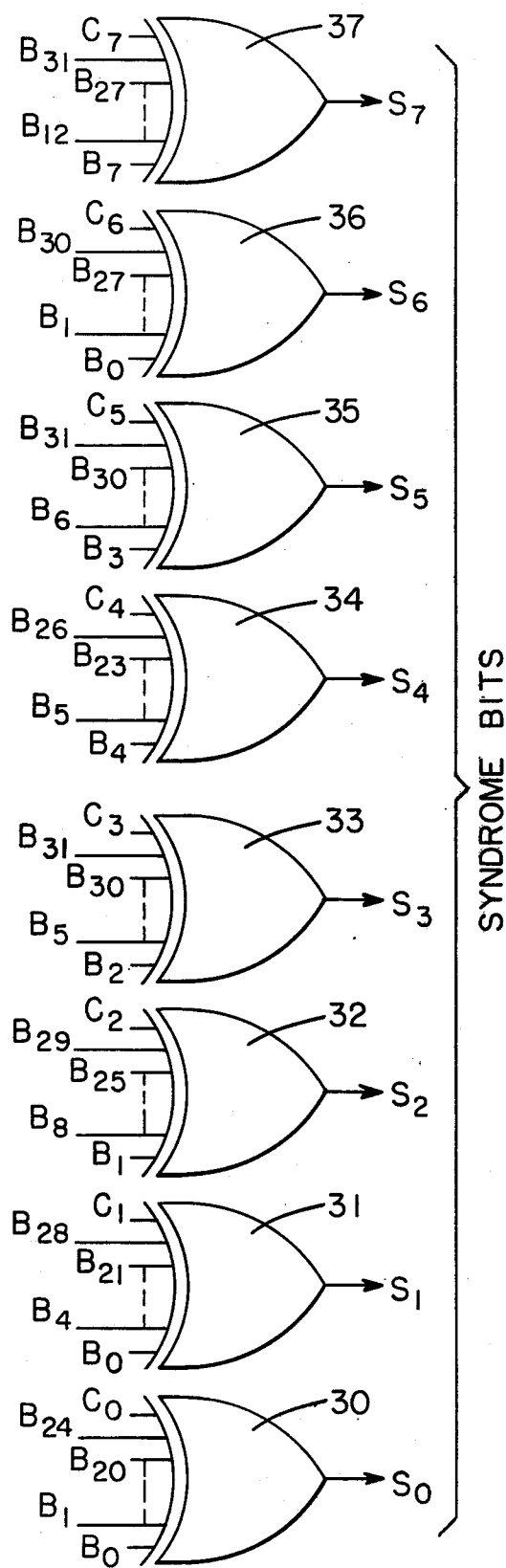

ERROR CHECKING AND CORRECTING DEVICE

BACKGROUND OF THE INVENTION

The present invention relates to an error checking and correcting device and more particularly to a modular data processing system for providing single error correction, double error detection, and group error detection.

In data processing systems, it is necessary to transmit data between two points. Often there is noise in the communication channel through which the data is transmitted and as a result, the informational content of the data is distorted.

In order to check the data word transmitted for accuracy, various error detecting and correcting devices and techniques have been developed which typically requires some redundancy. These prior art techniques typically require the addition of check bits to the data word to form a code word with the entire code word being transmitted whenever the data portion of the code word is utilized. The check bits are typically generated according to some predetermined algorithm and the received code word is processed according to some predetermined algorithm to determine whether the data has been accurately transmitted.

Various single error correction, double error detection (SEC-DED) codes have been developed, such as the Hamming code (U.S. Pat. No. Re. 23,601 to Richard Hamming et al.) and Hsiao's minimum-odd-weight-column code (U.S. Pat. No. 3,623,155 to M. Y. Hsiao). These SEC-DED codes assume errors within a code word occur randomly and independently so that the probability of failure of every bit in the same code word is equal and independent of each other. The preferred environment for a random SEC-DED code is a communication channel in which each bit of a code word is discrete and homogeneous. An example of a discrete and homogeneous communication channel is a storage system with bit per card or bit per package arrangements.

From a packaging point of view, it is inefficient to partition the communication channel into discrete bit portions. It has therefore become necessary to partition the communication channel into modular groups, with a plurality of bits forming a group and a plurality of groups forming a code word. An example of a modular channel is a memory organized with multiple bits per card or multiple bits per package arrangements.

For a code word transmitted through a modular memory system, the malfunction of a module can affect many bits within the group. Depending upon the original information transmitted and the failure mode of the group, errors can be reflected in the receiver as a single bit failure, double bit failure, or a plurality of bit failures all in the same group.

SUMMARY OF THE INVENTION

The present invention provides for group error detection to check for catastrophic failure of a memory and logic package in addition to single error correction and double error detection for a code word having data bits and check bits with the bits arranged in groups. The codeword comprises a plurality of data bits and a plurality of check bits arranged in groups to be transmitted in parallel through a modular communication channel. In the preferred embodiment, the code word contains 40 bits with 32 data bits and 8 check bits, and the modular communication channel is a computer memory comprising 10 modules with 4 bits per module.

At the transmitter, a data register provides the data bits and a check bit generator provides check bits in accordance with an H-matrix which is partitioned into h-submatrices as set forth in Table I below. The construction of the h-submatrices is in accordance with rules necessary for group error detection in addition to single error correction and double error detection.

At the receiver, a syndrome bit generator generates syndrome bits from the received code word in accordance with the H-matrix shown in Table I.

TABLE I

H-matrix of a (40, 32, 4) SEC-DED-GED Code

| | Data Bit Groups | | | | | | | | | | | | | | | | | | | | | | | | | | | | | | | | Check Bit Groups | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| Group | $C_0$ | | | | $C_1$ | | | | $C_2$ | | | | $C_3$ | | | | $C_4$ | | | | $C_5$ | | | | $C_6$ | | | | $C_7$ | | | | $C_8$ | | | | $C_9$ | | | |
| Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | $C_0$ | $C_1$ | $C_2$ | $C_3$ | $C_4$ | $C_5$ | $C_6$ | $C_7$ |
| $S_0$ | x | x | | | x | x | x | | x | x | | | x | x | | | x | | | | x | | | | x | | | | x | | | | x | | | | | | | |
| $S_1$ | x | x | | | x | x | | x | x | | | x | x | x | | | x | x | x | | | x | | | | x | | | | x | | | | x | | | | | | |
| $S_2$ | | x | | | | x | x | | | x | x | | | x | x | | | x | x | | | x | x | | | x | x | | | x | x | | | | x | | | | | |
| $S_3$ | | | x | x | | | x | x | | | x | x | | | x | x | | | x | x | | | x | x | | | x | x | | | x | x | | | | x | | | | |
| $S_4$ | x | x | | | x | x | | | x | x | | | x | x | | | x | x | x | x | x | x | x | x | | | | | | | | | | | | | x | | | |
| $S_5$ | x | x | | | x | x | | | x | x | | | x | x | | x | | | | | | | | | x | x | x | x | x | x | x | x | | | | | | x | | |
| $S_6$ | | | x | x | | | x | x | | | x | x | | | x | x | x | x | | | x | x | | | x | x | | | x | x | | | | | | | | | x | |
| $S_7$ | | | x | x | | | x | x | | | x | x | | | x | x | | | x | x | | | x | x | | | x | x | | | x | x | | | | | | | | x |

Syndrome Bits: $S_0$–$S_7$ h-submatrix (repeated for each group)

The syndrome bits are applied to an error detection circuit which provides a first error flag signal if any error is detected. A second error flag signal is provided if there is a random double error detection (DED) or a group error detection (GED).

The syndrome bits are also applied to an error location circuit and the error detection circuit is also coupled to the error location circuit to provide single error correction (SED) if a single error is detected.

The data bits are applied to a data register which is ordinarily enabled to utilize the data it receives. The error location circuit is also applied to the data register. If no error is detected the data register remains enabled to utilize the data it receives. If a single error is detected, the error detection circuit enables the error location circuit to change the binary polarity of the binary bit in the location of the incorrect bit in the data register in which the single error is detected to thereby provide a single error correction (SEC) function.

If the error detection circuit detects two random errors in any locations in the code word, or if the error detection circuit detects a plurality of errors in the same group of data, the error detection circuit provides a second flag to signal the user that there has been a double error detection (DED) or group error detection (GED). The user may thereby disregard all of the data in the register The apparatus and method of the present invention is applicable to codes with any data word size transmitted through a modular communication channel of any modular group size as long as sufficient check bits are included in the code word to satisy the H-matrix of the present invention shown in Table I. However, a code word of 40 bits with 32 bits and 8 check bits transmitted through a modular memory channel with each module of the memory handling 4 bits in parallel has been chosen for illustrative purposes. This 40-bit SEC-DED-GED code is particularly applicable to a 32-bit word computer main memory with 4 bits per card organization or to a 32-bit word computer main memory using $1k \times 4$ RAM or $4k \times 4$ RAM as storage devices and using quad bus drivers and quad receivers as storage buffers.

Accordingly, a primary object of the present invention is to provide an error checking and correcting device for data transmitted through a modular memory channel. To accomplish this it is necessary to identify the kinds of error that would appear in the received code word of a modular memory in which one module is faulty. Consider, for example, that group $G_0$ of the modular memory, shown in the H-matrix of Table I, is erroneous so that data bits ($B_0 B_1 B_2 B_3$) transmitted to the receiver are always stuck at logic state '0'. Assuming all other modular groups are functioning properly, Table II shows the number of errors in the received code word for various input combinations of group $G_0$ at the transmitter.

TABLE II

| GO INPUT (B0 B1 B2 B3) | | | |
|---|---|---|---|
| AT TRANS- MITTER | AT REC- EIVER | NO. OF BIT FAILURES | DIAGNOSIS |
| 0000 | 0000 | 0 | no error |
| 0001 | 0000 | 1 | correctable error |
| 0010 | 0000 | 1 | correctable error |
| 0100 | 0000 | 1 | correctable error |
| 1000 | 0000 | 1 | correctable error |
| 0011 | 0000 | 2 | uncorrectable error |
| 0110 | 0000 | 2 | uncorrectable error |

TABLE II-continued

| GO INPUT (B0 B1 B2 B3) | | | |
|---|---|---|---|
| AT TRANS- MITTER | AT REC- EIVER | NO. OF BIT FAILURES | DIAGNOSIS |
| 0101 | 0000 | 2 | uncorrectable error |
| 1100 | 0000 | 2 | uncorrectable error |
| 1010 | 0000 | 2 | uncorrectable error |
| 1001 | 0000 | 2 | uncorrectable error |
| 0111 | 0000 | 3 | uncorrectable error |
| 1011 | 0000 | 3 | uncorrectable error |
| 1101 | 0000 | 3 | uncorrectable error |
| 1110 | 0000 | 3 | uncorrectable error |
| 1111 | 0000 | 4 | uncorrectable error |

No. of bit failures in a group

It can be appreciated that depending upon the original information transmitted and the failure mode of the module, no error, single bit error, or a plurality of bit errors all in the same group can appear in the code word. This invention provides an error checking device capable of differentiating between usable information and unusable information. It is therefore another object of the present invention to construct a single error correction, random double error detection, and group error detection (SEC-DED-GED) code. The structure of the code is presented through the H-matrix shown in Table I.

Referring to Table I, the H-matrix is partitioned into lower case h-submatrices corresponding to the group boundaries of the modular memory. The assignment of entries of $x$ in the $h$-submatrices is important. For the purpose of group error detection, the following rules are necessary:
1. Each column in the H-matrix is distinct.
2. The $h$-submatrices corresponding to data bit groups ($G_0$ to $G_7$) have three entries per column only.
3. The $h$-submatrices corresponding to check bit groups ($G_8$ and $G_9$) have one entry per column only.
4. In each $h$-submatrix corresponding to data bit groups, i.e. $G_0$ through $G_7$, there is one common row of entries in the first four rows and there is another common row of entries in the last four rows.

A code with an H-matrix satisfying the above constraints has an overall minimum distance of four, and is therefore capable of correcting a single error and detecting a random double error in addition to detecting group errors. The above constraints ensure that, in the diagnosis of received data, non-overlapping syndrome subsets are generated to separate usable data from unusable data. At the receiver, the diagnosis is in accordance with the following algorithm:
1. If all syndrome bits are false, there is no error.
2. If one syndrome bit is true, a single correctable error in a check bit group is present.
3. If an even number of syndrome bits are true, uncorrectable errors are present. The uncorrectable errors can be either random double errors or a double error in a group of quadruple error in a group.
4. If three syndrome bits are true and all of them are located in either $S_0 S_1 S_2 S_3$ or $S_4 S_5 S_6 S_7$, uncorrectable triple errors in the check bit group are present.
5. If three syndrome bits are true and not all of them are located in either $S_0 S_1 S_2 S_3$ or $S_4 S_5 S_6 S_7$, a single correctable error in the data bit group is present.

6. If five syndrome bits are true, an uncorrectable triple error in the data bit group is present.

The check bits ($C_0$ to $C_7$) are determined by the odd parity of those data bits which have an entry of 'x' in the associated row of the H-matrix and are generated by EXCLUSIVE OR circuitry. For example, check bit $C_0$ is the odd parity of data bits $B_0$, $B_1$, $B_2$, $B_3$, $B_4$, $B_5$, $B_6$, $B_7$, $B_{12}$, $B_{16}$, $B_{20}$, and $B_{24}$ (the odd parity is the binary sum bit). It is thus seen that the 8 check bits ($C_0$ to $C_7$) are obtained in accordance with the logic equations set forth in Table III, wherein the sign $\oplus$ means EXCLUSIVE OR.

TABLE III $C_0 = b_0 \oplus b_1 \oplus b_2 \oplus b_3 \oplus b_4 \oplus b_5 \oplus b_6 \oplus b_7 \oplus b_{12} \oplus b_{16} \oplus b_{20} \oplus b_{24}$
$C_1 = b_0 \oplus b_4 \oplus b_8 \oplus b_9 \oplus b_{10} \oplus b_{11} \oplus b_{12} \oplus b_{13} \oplus b_{14} \oplus b_{15} \oplus b_{21} \oplus b_{28}$
$C_2 = b_1 \oplus b_8 \oplus b_{16} \oplus b_{17} \oplus b_{18} \oplus b_{19} \oplus b_{20} \oplus b_{21} \oplus b_{22} \oplus b_{23} \oplus b_{25} \oplus b_{29}$
$C_3 = b_2 \oplus b_5 \oplus b_9 \oplus b_{13} \oplus b_{24} \oplus b_{25} \oplus b_{26} \oplus b_{27} \oplus b_{28} \oplus b_{29} \oplus b_{30} \oplus b_{31}$
$C_4 = b_4 \oplus b_5 \oplus b_6 \oplus b_7 \oplus b_{10} \oplus b_{14} \oplus b_{17} \oplus b_{20} \oplus b_{21} \oplus b_{22} \oplus b_{23} \oplus b_{26}$
$C_5 = b_3 \oplus b_6 \oplus b_{11} \oplus b_{15} \oplus b_{16} \oplus b_{17} \oplus b_{18} \oplus b_{19} \oplus b_{28} \oplus b_{29} \oplus b_{30} \oplus b_{31}$
$C_6 = b_0 \oplus b_1 \oplus b_2 \oplus b_3 \oplus b_8 \oplus b_9 \oplus b_{10} \oplus b_{11} \oplus b_{18} \oplus b_{22} \oplus b_{27} \oplus b_{30}$
$C_7 = b_7 \oplus b_{12} \oplus b_{13} \oplus b_{14} \oplus b_{15} \oplus b_{19} \oplus b_{23} \oplus b_{24} \oplus b_{25} \oplus b_{26} \oplus b_{27} \oplus b_{31}$ As indicated above, the code word during transmission is subject to the introduction of errors. The syndrome bits ($S_0$ to $S_7$) are generated in the syndrome bit generator at the receiver from the received code word by referring to the H-matrix shown in Table I in a similar manner. Syndrome bits ($S_0$ through $S_7$) are determined by the odd parity of those data bits and check bits which have an entry of 'x' in the associated row of the H-matrix. The logic equations for generating the syndrome bits from the received code word is shown in Table IV, wherein again the sign $\oplus$ means EXCLUSIVE OR.

TABLE IV $S_0 = b_0 \oplus b_1 \oplus b_2 \oplus b_3 \oplus b_4 \oplus b_5 \oplus b_6 \oplus b_7 \oplus b_{12} \oplus b_{16} \oplus b_{20} \oplus b_{24} \oplus C_0$
$S_1 = b_0 \oplus b_4 \oplus b_8 \oplus b_9 \oplus b_{10} \oplus b_{11} \oplus b_{12} \oplus b_{13} \oplus b_{14} \oplus b_{15} \oplus b_{21} \oplus b_{28} \oplus C_1$
$S_2 = b_1 \oplus b_8 \oplus b_{16} \oplus b_{17} \oplus b_{18} \oplus b_{19} \oplus b_{20} \oplus b_{21} \oplus b_{22} \oplus b_{23} \oplus b_{25} \oplus b_{29} \oplus C_2$
$S_3 = b_2 \oplus b_5 \oplus b_9 \oplus b_{13} \oplus b_{24} \oplus b_{25} \oplus b_{26} \oplus b_{27} \oplus b_{28} \oplus b_{29} \oplus b_{30} \oplus b_{31} \oplus C_3$
$S_4 = b_4 \oplus b_5 \oplus b_6 \oplus b_7 \oplus b_{10} \oplus b_{14} \oplus b_{17} \oplus b_{20} \oplus b_{21} \oplus b_{22} \oplus b_{23} \oplus b_{26} \oplus C_4$
$S_5 = b_3 \oplus b_6 \oplus b_{11} \oplus b_{15} \oplus b_{16} \oplus b_{17} \oplus b_{18} \oplus b_{19} \oplus b_{28} \oplus b_{29} \oplus b_{30} \oplus b_{31} \oplus C_5$
$S_6 = b_0 \oplus b_1 \oplus b_2 \oplus b_3 \oplus b_8 \oplus b_9 \oplus b_{10} \oplus b_{11} \oplus b_{18} \oplus b_{22} \oplus b_{27} \oplus b_{30} \oplus C_6$
$S_7 = b_7 \oplus b_{12} \oplus b_{13} \oplus b_{14} \oplus b_{15} \oplus b_{19} \oplus b_{23} \oplus b_{24} \oplus b_{25} \oplus b_{26} \oplus b_{27} \oplus b_{31} \oplus C_7$ Accordingly, it is an object of the present invention to provide error checking and correcting means for detecting all the uncorrectable errors caused by the failure of a group in a code word in addition to correcting single bit errors and detecting random double errors.

It is another object of the present invention to provide error checking and correcting means for single error correction, double error detection and group error detection with optimal design in terms of delay and hardware implementation.

Other objects, advantages and novel features of the present invention will become apparent from the following detailed description of the invention when considered in conjunction with the accompanying drawings.

BRIEF DESCRIPTION OF THE DRAWINGS

FIG. 2 is a block diagram of the check bit generator.

FIG. 3 is a block diagram of the syndrome bit generator.

DESCRIPTION OF THE PREFERRED EMBODIMENT

Figure 1:
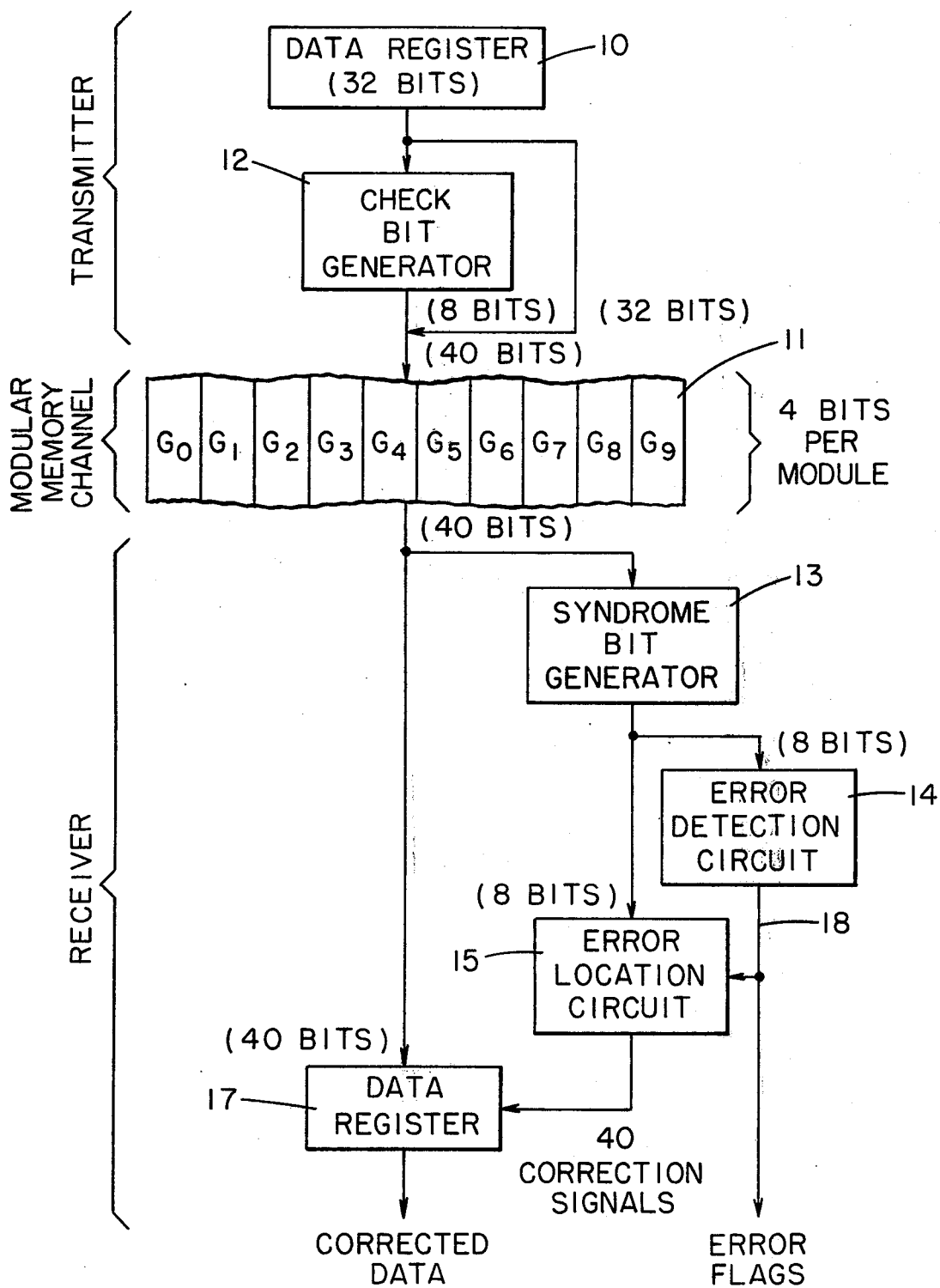
FIG. 1 is a block diagram of the system of the present invention

Referring to the block diagram of FIG. 1, there is shown an error checking and correcting system for providing single error correction, double error detection, and group error detection in a code word transmitted through a modular communication channel.

Means for generating a code word formed of groups of bits is provided and in the preferred embodiment, this includes a data register 10 and a check bit generator 12. The data register 10 of the preferred embodiment provides 32 data bits ($B_0$–$B_{31}$) as shown in Table I above. The check bit generator 12 provides 8 check bits ($C_0$ through $C_7$), in accordance with the algorithm shown in Table III, above, which was derived from the H-matrix shown in Table I above. The data bits and the check bits are combined to form a code word which, in the preferred embodiment, is broken down into groups of 4 bits each as shown in Table I.

Modular memory channel means is provided for transmitting the code word in groups of bits and in the preferred embodiment this is shown as modular memory channel 11. The modular memory channel transmits each of the groups of bits in parallel to a receiving terminal. In the process of transmission of the bits, the information content of the code word can be distorted. It is therefore necessary to provide error checking and correcting of the code word.

Means for receiving the code word is provided which includes means for providing the error checking and correcting function. The means for receiving the code word, in the preferred embodiment, includes syndrome bit generator means 13, error detection circuit 14 and error location circuit 15. The means for receiving the code word also includes a data register 17 for registering the received data.

The received code word in the preferred embodiment having 32 data bits and 8 check bits is applied to the syndrome bit generator 13 and the data register 17.

The syndrome bit generator 13 generates a plurality of syndrome bits in accordance with the algorithm shown in Table IV, above, which was derived from the H matrix shown in Table I. The syndrome bit generator provides the syndrome bits for use by the error detection circuit 14 and the error location circuits 15 to perform the functions of SEC, DED, and GED.

The error detection circuit 14 includes means for generating error signals which includes error flags 18 which signal a detection of either a single error or the detection of a random double error or a plurality of errors in any one group of bits in the code word.

The error location circuit means 15 is coupled to the output of the syndrome bit generator and receives the syndrome bits. The error location circuit means 15 is further coupled to the output of the error detection circuit means 14 and receives error flag signals from error flag outputs 18 of the error detection circuit 14. The error location circuit 15 is coupled to the data register 17 and is operative to correct a single error in the code word. If the error detection circuit 14 provides an error flag signifying a random double error or a plurality of errors in one group, the entire code word may be disregarded and eliminated from the data register 17 and another code word may be entered into the data register 17.

The check bit generator 12 is shown in greater detail in FIG. 2. In the preferred embodiment, the 8 check bits are broken down into groups of 4 bits each as shown in Table I. The 32 data bits, $B_0$-$B_{31}$ are applied to EXCLUSIVE OR gates 20-27 to provide the check bits $C_0$-$C_7$ in accordance with the algorithm shown in Table III, above, which is based on the H matrix in Table I. above. The EXCLUSIVE OR gates provide an odd parity (the check bit is the binary sum digit of the input bits). For example, the check bit $C_1$ is the odd parity of data bits $B_0$, $B_4$, $B_8$, $B_9$, $B_{10}$, $B_{11}$, $B_{12}$, $B_{13}$, $B_{14}$, $B_{15}$, $B_{21}$, and $B_{28}$.

The syndrome bit generator 13 is shown in detail in the block diagram of FIG. 3. In the preferred embodiment, the 32 data bits and the 8 check bits are transmitted through the modular memory channel 11 and applied to the 40 inputs of the syndrome bit generator 13 as shown in FIG. 3. The syndrome bit generator includes EXCLUSIVE OR gates 30 through 37 for providing the syndrome bits $S_0$-$S_7$ in accordance with the algorithm in Table IV, above, based on the H matrix in Table I above. The EXCLUSIVE OR gates 30-37 provide an odd parity of the input data bits and check bits in accordance with the entry of an "X" in the associated row and column of the H matrix of Table I. For example, the syndrome bit $S_1$ is the odd parity of data bits $B_0$, $B_4$, $B_8$, $B_9$, $B_{10}$, $B_{11}$, $B_{12}$, $B_{13}$, $B_{14}$, $B_{15}$, $B_{21}$, $B_{28}$, and $C_1$.

Figure 4:
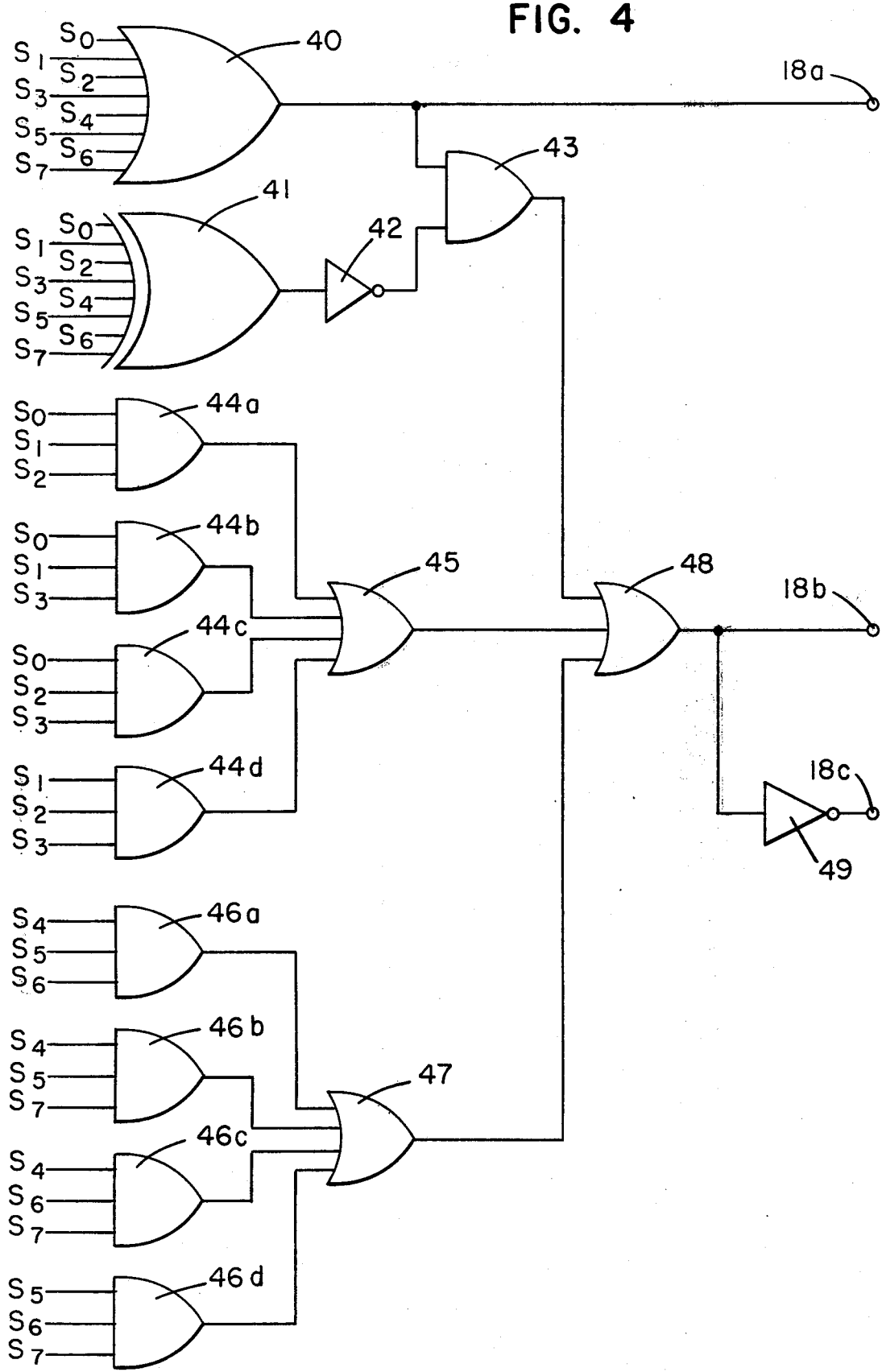
FIG. 4 is a block diagram of the error detection circuit.

The error detection circuit 14 includes first circuit means coupled to the output of the syndrome bit generator 13 for generating an error signal if the informational content of the syndrome bits indicates a detection of any error in the transmission of the code word. In the preferred embodiment, this is shown as OR gate 40 having syndrome bits $S_0$-$S_7$ applied thereto as shown in FIG. 4. The introduction of either correctable or uncorrectable errors in the code word produces a non-zero syndrome bit among the syndrome bits $S_0$-$S_7$ which is detected by the OR circuit 40 to provide a signal on output terminal 18a.

Second circuit means is provided in the error detection circuit 14 and being coupled to the output of the syndrome bit generator means 13 for generating an error signal if the informational content of the syndrome bits indicates detection of a random double error or an even number of errors in a group in the code word. In the preferred embodiment, this is shown as EXCLUSIVE OR gate 41 having inputs $S_0$-$S_7$. The output of EXCLUSIVE OR gate 41 is coupled to the input of an inverter 42 which in turn is coupled to the input of AND gate 43. A second input to AND gate 43 is coupled to the output of OR gate 40. The second circuit means including EXCLUSIVE OR gate 41, inverter 42, and AND gate 43 together with the OR gate 40, provide a check for uncorrectable errors due to either random double errors, double errors in a group, or quadruple errors in a group, all of which are indicated by an even number of true syndrome bits among the pattern of syndrome bits $S_0$-$S_7$. This type of error is indicated by an output from the AND gate 43 to the input of OR gate 48 to output terminal 18b to provide an error signal to indicate that the data received by the receiving means is unusable.

Third circuit means is coupled to the output of the syndrome bit generator 13 for generating a signal if the informational content of the syndrome bits indicates a detection of a plurality of errors in the same group of the code word. In the preferred embodiment, the third circuit means provides detection of three errors. However, the teachings of the present invention enable one skilled in the art to adapt the third circuit means to provide detection of an odd number of errors greater than one in the same group of bits of a code word having groups with any desired number of bits in each group.

In the preferred embodiment, the third circuit means includes AND gates 44a, 44b, 44c and 44d with the output of the AND gates 44a-44d being coupled to the input of OR gate 45. The third circuit means also includes AND gates 46a, 46b, 46c and 46d having outputs coupled to the input of OR gate 47. The output of OR gate 47 is applied to an input of OR gate 48.

Figure 5:
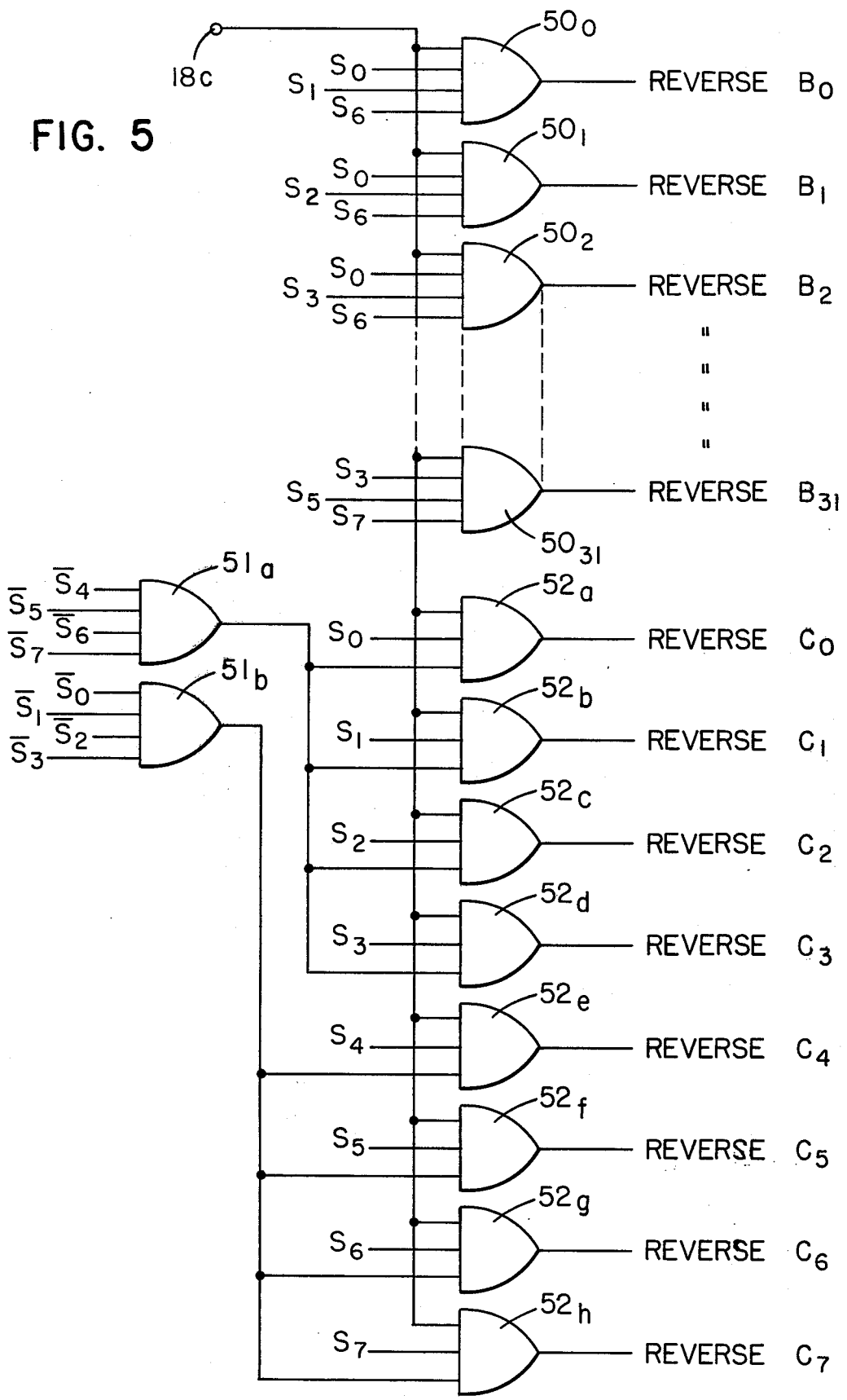
FIG. 5 is a block diagram of the error location circuit.

The third circuit means including the AND gates 44a, through 44d and the OR gate 45 detect three errors in a group of data bits or a group of check bits which is indicated by having three or five true syndrome bits with three true syndrome bits located in the first four syndrome positions ($S_0$, $S_1$, $S_2$, $S_3$). Similarly, the AND gates 46a-46d in combination with OR gate 47 provide a detection of three errors in any data group or in any check bit group which is indicated by having three or five true syndrome bits with three true syndrome bits located in the last four syndrome positions, ($S_4$, $S_5$, $S_6$, and $S_7$). Three errors in any one group is uncorrectable by the present invention and an output from the OR gate 45 or OR gate 47 as well as an output from AND gate 43 is transmitted through OR gate 48 to output terminal 18b to indicate that the data received by the receiving means is unusable. If an error is detected by an output signal on error flag signal terminal 18a but not on the error flag signal terminal 18b, a correctable single error is indicated. The inverter 49 then provides a control signal to enable the error location circuit 15 shown in greater detail in FIG. 5.

The error location circuit 15 includes a plurality of AND gates 50 each of which corresponds to one of the 32 data bits, $B_0$-$B_{31}$, and a second plurality of AND gates 52 each corresponding to one of the check bits $C_0$ through $C_7$. In addition, a pair of AND gates 51 have inputs coupled to the negation syndrome bits. The output terminal 18c is coupled to each input of the AND gates 50 and 52. If an uncorrectable random double error is detected or a plurality of errors in any group of bits of the code word is detected, the AND gates 50 and 52 are disenabled and the data in the code word is considered unusable.

If an error signal is indicated by an output on terminal 18a but not by any signal on terminal 18b, a single error is indicated. The inverter 49 provides an output signal to enable the AND gate 50 and 52 of the error location circuit.

A single error correction is possible since the failure of a bit would result in a syndrome pattern coinincidental with a particular column in the H matrix. If the single error occurs in a data bit, three syndrome bits will be true. For example, the failure of bit $B_0$ would be indicated by a syndrome pattern, $S_0 S_1 S_2 S_3 S_4 S_5 S_6 S_7 = 11000010$. Referring to the error location circuit of FIG. 5, the first AND gate of the plurality of AND gates 50 matches this syndrome pattern, i.e., $S_0 = S_1 = S_6 = 1$. This would provide a correction signal to the data register to reverse the polarity of data bit $B_0$ which has been identified as being in error.

Correspondingly, if a single error occurs in one of the check bits $C_0$-$C_7$, only one syndrome bit is true. The plurality of AND gates 51 and the plurality of AND gates 52 provide a logic function to identify the incorrect check bit and send a correction signal to the data register 17 to reverse the polarity of the check bit which is in error. The outputs of the error location circuit 15 thereby correct a single error in the code word in the data register 17.

According to the syndrome pattern of the present invention the error detection circuit thereby permits utilization of the received data if no error is detected or enables the error location circuit 15 to provide for single error correction in the data register if a single error is detected. The invention further provides an error flag signal on error flag output terminal 18b to prohibit utilization of the received code word which includes the data word if any random double error or a plurality of errors in the same group of bits are detected.

Obviously, many modifications and variations of the present invention are possible in light of the above teachings. It is therefore to be understood that within the scope of the appended claims, the invention can be practiced otherwise than as specifically described.

I claim:

1. A system for providing single error correction, double error detection, and group error detection in a code word having plural groups of information and check bits, which comprises:
    generator means receiving said code word for generating a plurality of syndrome bits,
    first circuit means coupled to the output of said generator means for generating a first error signal if the informational content of said syndrome bits indicates a detection of any error in the transmission of said code word,
    second circuit means coupled to the output of said generator means for generating a second error signal if the informational content of said syndrome bits indicates a detection of two random errors in said code word or an even number of errors in one of said plural groups,
    third circuit means coupled to the output of said generator means for generating a third error signal if the informational content of said syndrome bits indicates a detection of an odd number of errors greater than one in one of said plural groups, and
    error location circuit means in electrical communication with said generator means and said first, said second, and said third circuit means for providing an error correction in response to the detection of a single error in said code word.

2. The system as described in claim 1 and wherein said first circuit means includes OR gate means coupled to the output of said generator means for generating said first error signal.

3. The system as described in claim 1 and wherein said second circuit means includes EXCLUSIVE OR gate means coupled to the output of said generator means for generating said second error signal.

4. The system as described in claim 1 and wherein said third circuit means includes AND gate means and OR gate means, said AND gate means having inputs coupled to said generator means and having outputs coupled to said OR gate means, said OR gate means having first and second outputs with said first output for providing said third error signal and said second output being coupled to said error location circuit means for disabling said error location circuit means in response to said third error signal.

5. The system as described in claim 1 and wherein said second circuit means includes EXCLUSIVE OR gate means coupled to the output of said generator means for generating said second error signal, and said third circuit means includes AND gate means and OR gate means, said AND gate means and said EXCLUSIVE OR gate means having outputs coupled to the inputs of said OR gate means, said OR gate means having first and second outputs with said first output for providing an error signal if the informational content of said syndrome bits indicates a detection of said two random errors or a plurality of errors in one of said plural groups and said second output being coupled to said error location circuit means for disabling said error location circuit means if said two random errors or said plurality of errors are detected.

6. The system as described in claim 1, and further including OR gate means in electrical communication with said third circuit means and said error location circuit means, said OR gate means having first and second outputs with said first output for providing said third error signal and said second output for disabling said error location circuit means in response to said third error signal.

7. The system as described in claim 1 and wherein said second circuit means includes EXCLUSIVE OR gate means coupled to the output of said generator means for generating said second error signal, and
    OR gate means coupled to the output of said second circuit means and to the output of said third circuit means, said OR gate means having first and second outputs with said first output for providing an error indication if the informational content of said syndrome bits indicates a detection of said two random errors or a plurality of errors in one of said plural groups and said second output being inverted and coupled to said error location circuit means for disabling said error location circuit means in response to said error indication.

8. An error detection and correction system, which comprises:
    a. first generator means receiving an information bit stream for providing check bits to form a code word of plural bit groups in accordance with an H-matrix, said H-matrix having a bit structure partitioned to correspond with the boundaries of said plural bit groups and patterned to accommodate the correction of said code word if the presence of only one error is detected and to accommodate the detection of two random errors in said code word and plural errors occurring in one of said plural bit groups;
    b. second generator means in electrical communication with said first generator means for operating upon said code word in accordance with said H-matrix to provide syndrome bits; and
    c. logic means responsive to said syndrome bits and in electrical communication with said first generator means for correcting said one error and signalling the occurrence of said plural errors and said two random errors.

9. The system as described in claim 8 and wherein said first generator means includes a plurality of EXCLUSIVE OR gates for providing check bits by odd parity binary addition of a predetermined combination of information bits in accordance with said H-matrix.

10. The system as described in claim 8 and wherein said second generator means includes a plurality of EXCLUSIVE OR gates for providing syndrome bits by odd parity binary addition of a predetermined combination of information bits and check bits in accordance with said H-matrix.

* * * * *